United States Patent
Ciaramitaro (10) Patent No.: US 10,861,105 B2
(45) Date of Patent: Dec. 8, 2020

(54) COMPUTER READABLE MEDIUM, SYSTEM, AND METHOD OF PROVIDING A VIRTUAL VENUE FOR THE TRANSFER OF TAXPAYER-SPECIFIC INFORMATION

(71) Applicant: HRB Innovations, Inc., Las Vegas, NV (US)

(72) Inventor: Mark Ciaramitaro, Leawood, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 529 days.

(21) Appl. No.: 14/497,625

(22) Filed: Sep. 26, 2014

(65) Prior Publication Data

US 2016/0092993 A1 Mar. 31, 2016

(51) Int. Cl.
*G06Q 40/02* (2012.01)
*G06Q 40/00* (2012.01)

(52) U.S. Cl.
CPC .................. *G06Q 40/123* (2013.12)

(58) Field of Classification Search
CPC ..................................... G06Q 40/02
USPC .......................................... 705/31
See application file for complete search history.

(56) References Cited

U.S. PATENT DOCUMENTS

| | | | | |
|---|---|---|---|---|
| 8,589,292 B1* | 11/2013 | Huberman | ............. | G06Q 30/06 705/26.35 |
| 2009/0157491 A1* | 6/2009 | Brougher | ............. | G06Q 10/063 705/59 |
| 2009/0157560 A1* | 6/2009 | Carter | ................. | G06Q 10/0633 705/80 |
| 2010/0036713 A1* | 2/2010 | Tang | ................... | G06Q 20/3674 705/67 |
| 2011/0196776 A1* | 8/2011 | Rash | ....................... | G06Q 30/02 705/37 |
| 2011/0313915 A1* | 12/2011 | Tang | .................... | G06Q 10/101 705/39 |
| 2013/0211876 A1* | 8/2013 | Perler | ..................... | G06F 21/31 705/7.29 |
| 2013/0282548 A1* | 10/2013 | Sycoff | .................... | G06Q 40/04 705/37 |
| 2014/0215638 A1* | 7/2014 | Nicolas | .................. | H04L 63/102 726/27 |
| 2014/0244399 A1* | 8/2014 | Orduna | ............. | G06F 17/30696 705/14.66 |
| 2014/0344015 A1* | 11/2014 | Puertolas-Montanes | | G06Q 20/10 705/7.29 |

* cited by examiner

*Primary Examiner* — Lindsay M Maguire
(74) *Attorney, Agent, or Firm* — Erise IP, P.A.

(57) ABSTRACT

A computer program, a system, and a method facilitate transactions of taxpayer-specific items of information between taxpayers and third parties in a virtual venue. A set of taxpayer information related, at least in part, to a filed tax return of the taxpayer is received. The set of taxpayer information is filtered to obtain a marketable information set, which in turn includes taxpayer-specific items. A third-party value is obtained for each taxpayer-specific item, and the taxpayer is presented a sale value for each taxpayer-specific item. The taxpayer is presented an option to select at least one taxpayer-specific item to be sold in the virtual venue and an option for the taxpayer to select at least one third party to which to sell said at least one taxpayer-specific item. Upon the selection of the options by the taxpayer, the transaction is then processed and completed.

20 Claims, 4 Drawing Sheets

COMPUTER READABLE MEDIUM, SYSTEM, AND METHOD OF PROVIDING A VIRTUAL VENUE FOR THE TRANSFER OF TAXPAYER-SPECIFIC INFORMATION

BACKGROUND

1. Field

Embodiments of the invention relate to monetizing personal information found on tax returns and other financial data of a taxpayer. More specifically, embodiments of the invention relate to a virtual venue that facilitates the taxpayer selling portions of their own personal information to a third party who values such information.

2. Related Art

Tax returns and other financial data sources contain information about an individual that may be valuable to a third party. Certain privacy laws and tax regulations prevent the disclosure of such information by tax preparers and financial professionals without consent of the individual to which the information pertains, such as a taxpayer. Regardless of such laws and regulations, good business practices require that tax preparers and financial professionals respect the confidence of their client taxpayers. However, no such law or regulation prevents a taxpayer from disclosing their own information.

Numerous companies are interested in, and willing to pay money for, the information found personal information associated with a taxpayer, including information located on a taxpayer's tax return. These companies are also interested in demographic information about the taxpayer, as well as information about their interests and potential purchases.

Currently, there is no way for the taxpayer to monetize the information found on their tax return. There exists a demand for such information by third parties and a supply of such information in the possession of taxpayers. Accordingly, there is a need for a venue to facilitate monetization of financial transactions of the taxpayers' information.

SUMMARY

Embodiments of the invention solve the above-mentioned problems by providing a virtual venue for the taxpayer to sell portions of their information, including financial information, and for third parties to buy such information. The invention enables taxpayers to monetize their information and reap the benefits thereof. Embodiments of the invention are, at the least, an advance in the technology of electronic commerce as herein described.

Embodiments of the invention are generally directed to a computerized method for enabling a taxpayer to monetize their information, including financial information. The method broadly comprises, but does not necessarily require, the steps of receiving a set of taxpayer information, filtering the information to produce a marketable information set, generating a third-party value for each taxpayer-specific item within the marketable information set, presenting the taxpayer with the option to sell the taxpayer-specific items for a sale value, receiving from the taxpayer a selection to sell, exchanging the taxpayer-specific item to the third party for the third-party value, and transmitting to the taxpayer the sale amount.

Embodiments of the invention are also generally directed to a system for providing a virtual venue through which a taxpayer can elect to sell at least one taxpayer-specific item of information. The system comprises a tax preparation device, a server device, and at least one third-party device.

Yet further embodiments of the invention are directed to a computer readable storage medium having a computer program stored thereon for providing a virtual venue for a taxpayer to sell at least one taxpayer-specific item of data to at least one third party. The computer program instructs at least one processing element to perform one or more of the following steps: receive a set of taxpayer information, filter the information to produce the marketable information set, generate a third-party value for each taxpayer-specific item within the set, present the taxpayer with the option to sell the taxpayer-specific items for a sale value, receive from the taxpayer a selection to sell, exchange the taxpayer-specific item to the third party for the third-party value, and transmit to the taxpayer the sale amount.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit embodiments the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

Embodiments of the invention comprise a computer program, a method, and a system for providing a virtual venue 10 accessible by at least one taxpayer for a transfer of taxpayer-specific information to a third party in exchange for receipt, by the taxpayer, of a monetary value for the taxpayer-specific information. As discussed below, the virtual venue 10 is available at an electronic resource, sub as a website or via an electronic app, and the venue 10 serves as an e-commerce site for the taxpayer's information. As discussed in detail below, embodiments of the invention broadly comprise the following steps: receiving a set of taxpayer information related, at least in part, to a filed tax return of the taxpayer; filtering the set of taxpayer information to obtain a marketable information set, wherein the marketable information set contains a plurality of taxpayer-specific items; generating a third-party value for each taxpayer-specific item within the marketable information set; presenting to the taxpayer a sale value for each taxpayer-specific item within the marketable information set, wherein the sale value is less than or equal to the third-party value; presenting an option for the taxpayer to select at least one taxpayer-specific item within the marketable information set to be sold in the virtual venue 10; presenting an option for the taxpayer to select at least one third party to which to sell said at least one taxpayer-specific item; and receiving from the taxpayer a selection to sell said at least one taxpayer-specific item to said at least one third party in the virtual venue 10.

Figure 1:
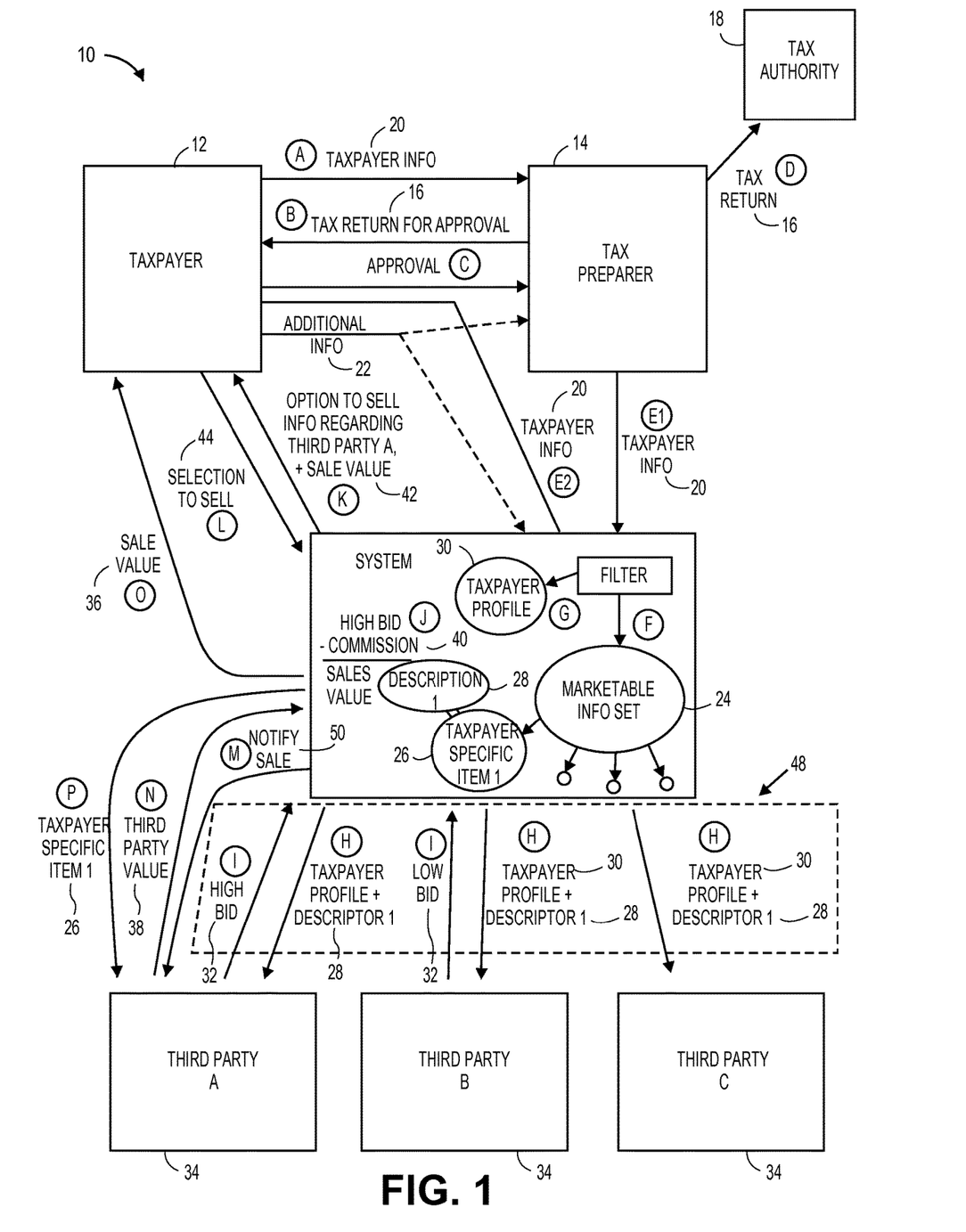
FIG. 1 is a flow diagram of an exemplary embodiment of the invention.

Turning to the figures, FIG. 1 presents an exemplary embodiment of a method of providing the virtual venue 10 for the transfer of taxpayer-specific information. FIG. 1 lays out a series of steps of an embodiment of the invention, some of which are set forth immediately above; however, it should be appreciated that other embodiments of the invention would utilize fewer or more steps, perform steps in a different order, and/or perform steps by different entities. The exemplary embodiment of FIG. 1 will now be discussed.

In Step A of FIG. 1 (the steps discussed herein with respect to FIG. 1 are indicated with the reference numeral inside a circle), a taxpayer 12 provides a tax preparer 14 with tax-related information, such as W2s, 1099s, and financial statements. In Step B, the tax preparer 14 uses this tax-related information to prepare a tax return 16 and submits the tax return 16 to the taxpayer 12 for approval. In Step C, the taxpayer 12 reviews the tax return 16 and approves it. In Step D, the tax preparer 14 submits the tax return 16 to a relevant government taxing authority 18, such as the Internal Revenue Service. In Step E1, the tax preparer 14 submits a set of taxpayer information 20 to the computer program of embodiments of the invention. In an alternative Step E2, the taxpayer 12 submits the set of taxpayer information 20 to the computer program. Optionally, the taxpayer 12 may provide a set of additional information 22, such as qualitative information or demographic information, to the tax preparer 14 or the system. In Step F, the computer program filters the set of taxpayer information 20 into a marketable information set 24. The marketable information set 24 comprises a plurality of taxpayer-specific items 26 of information. All or some of the taxpayer-specific items 26 have a descriptor 28 associated with them. In Step G, the computer program generates a taxpayer profile 30 that represents non-specific information about the taxpayer 12. In Step H, the computer program solicits a bid 32 from each of a plurality of third parties 34 (shown as Third Party A, Third Party B, and Third Party C), by presenting the taxpayer profile 30 and the descriptor 28. In Step I, the computer program receives bids 32 from some or all of the third parties 34. As shown in FIG. 1, Third Party C did not submit a bid 32, Third Party B submitted a low bid 32, and Third Party A submitted a high bid 32. In Step J, the computer program calculates a sale value 36 by taking the high bid 32 from Third Party A (known hereinafter as a "third-party value" 38) less a commission 40. In Step K, the computer program presents to the taxpayer 12 an option to sell 42 the taxpayer-specific item 26, along with information indicative of Third Party A, and the calculated sale value 36. In Step L, the computer program receives a selection to sell 44 from the taxpayer 12. In Step M, the computer program notifies Third Party A that the taxpayer 12 intends to sell. In Step N, the computer program receives the third-party value 38, being the high bid 32 from Third Party A. In Step O, the computer program transmits to the taxpayer 12 the calculated sale value 36. In Step P, the computer program transmits to Third Party A the taxpayer-specific item 26. Again, it should be noted that the step numbers and order discussed above are only exemplary and not limiting.

The taxpayer 12 includes any entity, either a legal or natural person, that files a tax return with a government taxing authority. Taxes to be paid can be United States Federal Income Tax, income tax for the various states within the United States, corporate taxes, partnership taxes, LLC taxes, property taxes, tariffs, or other taxes. Typically, the taxpayer 12 provides information relevant to themselves and the amount of tax owed in the form of the tax return 16. The tax return 16 is discussed more below.

It should be appreciated that although the entity monetizing their tax-specific information is labeled herein a taxpayer, embodiments of the invention contemplate that any entity may monetize their personal information via the virtual venue. Because of the nature of a taxpayer and associated tax return, much information associated with the tax return is valuable to and desired by third parties. However, embodiments of the invention may be equally applied to any entity and regardless from where the personal information is obtained. Thus, use of the labels "taxpayer" and "taxpayer-specific item" or taxpayer information herein is not intended to be limiting.

The tax preparer 14 includes any entity, either a legal person or natural person, or a computer program adapted to preparing taxes or providing other financial services. Examples of tax preparers 14 include, but are not limited to, the following: a company, such as H&R Block, Inc.®, or an employee or agent of such a company; software adapted to prepare tax returns 16 or other financial documents; and a person, legal or natural, who advises or assists the taxpayer 12 in preparing their own tax return 16. The tax preparer may also comprise a database 46 for storing at least a portion of the set of taxpayer information 20 and/or the marketable information set 24. In other embodiments, discussed below and illustrated in FIGS. 3 and 4, the database 46 is not associated with the tax preparer 14 but is instead associated with the virtual venue 10 of the system.

A financial professional (not illustrated) includes any entity, either a legal person or a natural person, or a computer program adapted to provide financial services or products. For example, the financial professional could be a financial advisor. By way of another example, the financial professional could be a website for monitoring the taxpayer's 12 financial assets and liabilities. As another example, the financial professional could be a family member of the taxpayer 12 without any specialized financial training. The financial professional does not actually prepare, or assist in preparing, the tax return 16. Instead, the financial professional has access to a completed and/or filed tax return 16 that was prepared by the taxpayer 12 or the tax preparer 14. The financial professional may act on behalf of either the taxpayer 12 or the tax preparer 14 in the discussed steps.

The third party 34 includes any entity, either a legal or natural person, other than the taxpayer 12, the tax preparer 14, or the financial professional. The third party 34 is an entity that desires to gain access of at least some of the taxpayer's information. The third party 34 may use the taxpayer-specific item 26 for commercial purposes, charitable purposes, survey purposes, census purposes, or a combination thereof. Examples of the commercial purpose could be an attempt to sell goods to the taxpayer 12, an attempt to sell services to the taxpayer 12, an attempt to enter into a contractual relationship with the taxpayer 12, or an attempt to buy goods or services from the taxpayer 12. The tax preparer 14 or financial professional, as used in the first sentence of this paragraph, refers to the tax preparer 14 or financial professional responsible for generating and/or filing the specific tax return 16. For example, the tax preparer 14 could act as a third party in which the taxpayer 12 has utilized the services of a different tax preparer to generate the tax return 16 upon which the information is located.

As used throughout, the terms "he" "his," or "himself," which may refer to any of the above entities depending on the context, should not be construed to only describe natural persons. Nor should it be construed to only describe male natural persons. The pronoun is used to allow ease of reading and not to limit the invention.

In embodiments of the invention, the tax preparer 14 and financial professional are the same entity, or are employees of the same entity, or are otherwise associated with each other through, for example, a contractual or business relationship. In some embodiments, there is no financial professional involved. In other embodiments, there is no tax preparer 14 involved, such as in an instance where the taxpayer 12 prepares their own tax return 16. As such, the term "tax preparer" or "financial professional" is used throughout to denote either or both the tax preparer 14 and financial professional.

The computer program receives information about the taxpayer 12. In one embodiment, the taxpayer 12 brings physical copies of his tax-related documents, such as W2s and 1099s, to the tax preparer 14. The tax preparer 14 then enters information from the tax-related documents into a tax preparation computer program. In another embodiment, the taxpayer 12 enters information from the tax-related documents into tax preparation software. The tax preparation computer program may be the same as or interface with the computer program of embodiments of the invention. In addition, the taxpayer 12 answers questions related to his taxes, either verbally to the tax preparer 14 or by inputting into the computer program.

In one embodiment, the taxpayer 12 is presented with the option to participate in the virtual venue 10 before the computer program receives the information from the taxpayer 12. In other embodiments, the computer program receives the information automatically at or near the filing of the tax return 16, for example, when the tax preparer 14 prepares and submits the tax return 16 via a computer-based system. In still other embodiments, the taxpayer 12 presents the information to the virtual venue 10 at a time after the preparation of the tax return 16. For example, if the virtual venue 10 is unaffiliated with the tax preparer 14, the tax preparer 14 may refer the taxpayer 12 to the virtual venue 10 to complete the transaction. The taxpayer 12 then directly submits the information to the virtual venue 10, such that the tax preparer 14 does not disclose any information about the taxpayer 12.

The tax return 16 is essentially a report filed with the appropriate government taxing authority 18, such as the Internal Revenue Service in the case of U.S. federal income tax. Typically, the tax return 16 contains information used to calculate the tax due. Typically, the tax return 16 is either printed or hand-written on a form generated by the taxing authority 18, such as the Form 1040. However, the tax return 16 could be on another type of form, a financial document, or other document. On the tax return 16, the taxpayer 12 or tax preparer 14 calculates the taxes due. To assist in the calculation and to allow the taxing authority 18 to verify the calculations, the tax return 16 contains pertinent information associated with the taxpayer 12 for the tax year. The tax return 16 can be either written, digital, or a combination of both. In other embodiments, information relevant to the taxpayer 12 and the tax to be paid are provided on other various forms and documents.

The set of taxpayer information 20 that is received by the computer program comprises the tax return 16 or information extracted from the tax return 16. The set of taxpayer information 20 may also include tax returns from previous years and/or relevant to other taxing authorities for the current and/or previous years, financial records, and bank statements. In yet other embodiments, the set of taxpayer information 20 received by the computer program further comprises qualitative data, contact information, and/or demographic information of the taxpayer 12, discussed below. In some embodiments, all of the information is received by the computer program as a single set. In other embodiments, the computer program may query the user to input the set of additional information 22. The taxpayer 12 may also provide information to the system that the tax preparer 14 does not have access to, such as financial records and bank statements.

Figure 2:
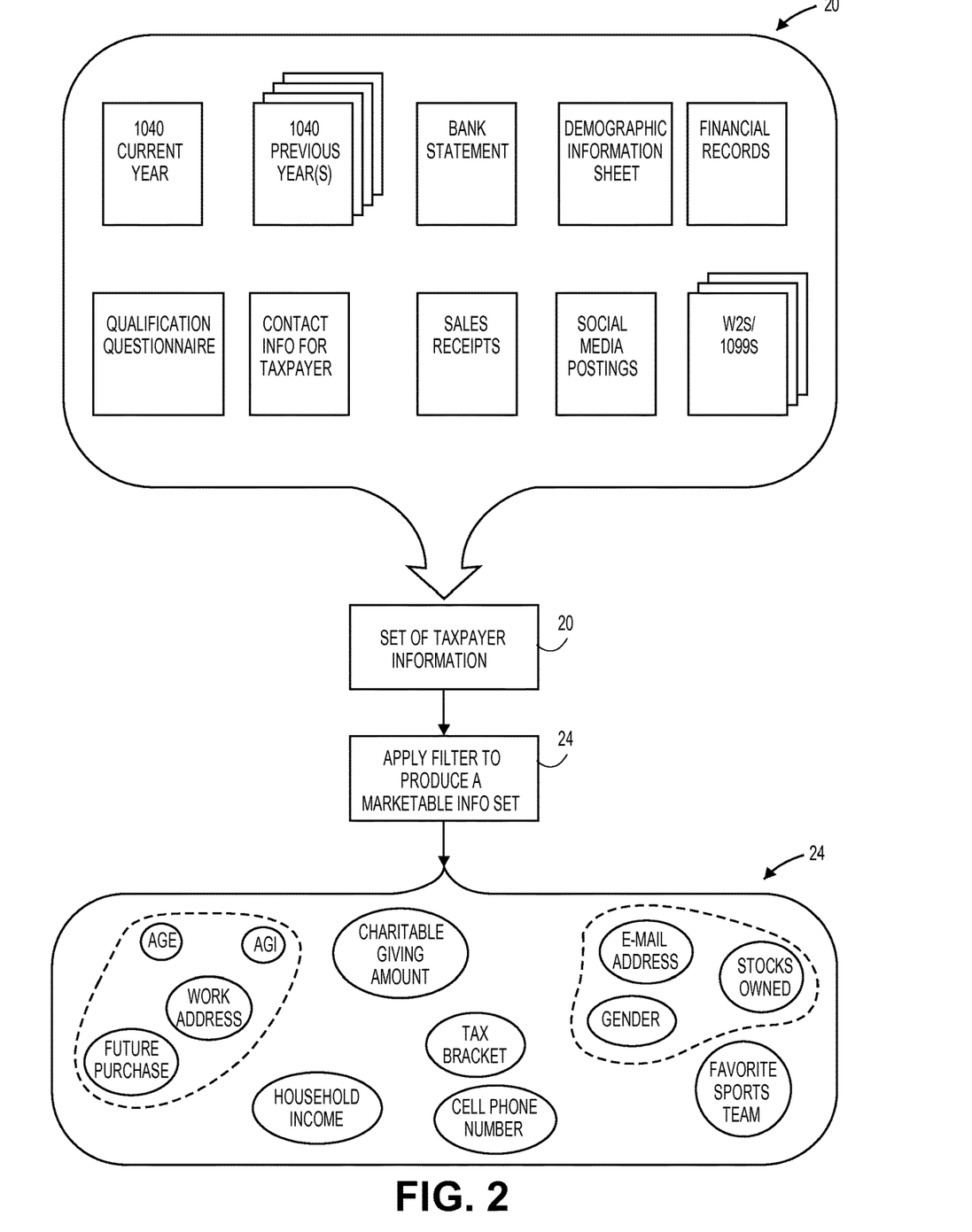
FIG. 2 is a flow diagram illustrating the sources of taxpayer information and exemplary taxpayer-specific items.

FIG. 2 illustrates various exemplary sources of information that go into the set of taxpayer information 20. These sources include, but are not limited to, the following: the Form 1040 for the current tax year, as discussed above; Form 1040s, or similar forms, for the previous tax year or tax years (which may already be in the database 46 if they were prepared by the tax preparer 14, or the taxpayer 12 may bring or submit copies of these previous 1040s); bank statements; a demographic information sheet, which the tax preparer 14 may request that the taxpayer 12 complete before, during, or after the tax return preparation; financial records; a qualitative questionnaire, which the tax preparer 14 may request that the taxpayer 12 complete before, during, or after the tax return preparation (qualitative information is discussed below); a set of contact information for the taxpayer; sales receipts from the current or previous tax years; social media postings; and other tax related documents such as W2s and Form 1099s from the current and/or previous tax years. The taxpayer 12 and/or the tax preparer 14 input information into the computer program. Some information may not be accessible to the tax preparer 14, such that the taxpayer 12 will input the information himself.

The computer program receives as input the information indicative of these documents and/or extracts the information from electronic versions of these documents. All, or at least a portion, of the received and extracted information is compiled into the set of taxpayer information 20. The compiled set of taxpayer information 20 may be stored on the database 46.

The computer program filters the set of taxpayer information 20 to produce the marketable information set 24, as illustrated in FIG. 2. In one embodiment, the filtering comprises the steps of analyzing the set of taxpayer information 20 to divide the set of taxpayer information 20 into a plurality of taxpayer-specific items 26 of data, categorizing each taxpayer-specific item 26 of data within the set of taxpayer information 20, and removing from the set of taxpayer information 20 each taxpayer-specific item 26 within certain categories. In embodiments of the invention, the categories to be removed comprise highly sensitive information, such as a social security number; information in which third parties 34 would not likely be interested, such as the amount of earnings withheld throughout the tax year via a Form W4; repetitive information, such as the taxpayer address that appears on most forms and documents; or a combination thereof.

Taxpayer-specific items 26 that are not filtered out remain in the set of taxpayer information 20. These remaining taxpayer-specific items 26 may fall into a number of broad categories, such as quantitative data, qualitative data, demographic information, contact information, or an aggregation of the above. In embodiments of the invention, the computer program queries the taxpayer 12 on categories of information to include or exclude from the marketable information set 24. For example, the taxpayer 12 may decline to include any demographic information into the marketable information set 24. Each of these categories will now be discussed.

Quantitative data represents information that can be measured. Quantitative data is typically represented by a number along with a unit, such as dollars or years. Quantitative data could also be represented by a ratio or other unit-less number. Common examples of quantitative data that may appear on the tax return 16 include, but are not limited to, yearly income, adjusted gross income, mortgage interest paid, stock earnings, age, number of dependents, number of people in a household, charitable giving, health-related spending, and business expenses. It should be noted that in some embodiments of the invention, some or all of the quantitative data may comprise ranges instead of, or in addition to, specific numbers. For example, quantitative data may include the range into which the taxpayer's income falls.

Qualitative data represents something that can be described in some fashion. Qualitative data typically can be observed or understood, but not measured. Tax returns generally contain little qualitative data. However, the computer program or a tax preparer 14 may query the taxpayer 12 before, during, or after the tax preparation process to receive qualitative information about the taxpayer 12. Examples of qualitative data include, but are not limited to, contemplated future purchases, favorite style of music, favorite sports team, favorite type of food, and favorite stores.

In embodiments of the invention, the computer program obtains qualitative information by analyzing quantitative and/or other categories of information. For example, the computer program may analyze the tax return 16 or other information within the set of taxpayer information 20 to determine a ratio of charitable giving to income. If the computer program finds that the taxpayer 12 gave more than 10% of their income to charity, the computer program may generate an item of qualitative data that labels the taxpayer 12 as "charitable." Similarly if the taxpayer 12 gave more than 20% of their income to charity, the computer program may label the taxpayer 12 as "very charitable." This information would be valuable to charities and other non-profit organizations in determining whether to purchase other taxpayer-specific items 26. Other possible qualitative labels of the taxpayer 12 include, but are not limited to, "stock trader," "small business owner," "retiree," "military service member," etc.

Demographic information represents characteristics of the population to which the taxpayer 12 is a member. Demographic information gives the third party 34 characteristics of the taxpayer 12 to allow for more targeted buying of taxpayer-specific items 26. Some demographic information appears on the tax return 16. The computer program or tax preparer 14 may query the taxpayer 12 before, during, or after the tax preparation process to receive demographic information as a portion of the set of additional information 22. Examples of demographic information include, but are not limited to, age range, gender, ethnicity, languages spoken, disabilities, employment status, socio-economic class, and general geographic locations in which the taxpayer 12 lives and works.

Contact information represents a method of reaching the taxpayer 12. Typically the value of the other types of data is severely diminished if not accompanied by a way to contact the taxpayer 12. Contact information may also provide other types of information about the taxpayer 12 as well, such as the city lived in and the preferred e-mail service provider. Much of the taxpayer's contact information is listed on the tax return 16. The computer program or tax preparer 14 may query the taxpayer 12 before, during, or after the tax preparation process to receive contact information as a portion of the set of additional information 22. Examples of contact information include, but are not limited to, home address, work address, home phone number, cell phone number, e-mail address, and social media account, such as a FACEBOOK™ account or a TWITTER™ handle.

Aggregate data is a combination of the above-mentioned and/or other types of data. Individual items of data are sometimes of little value to a third party. The value of information increases when it is aggregated with other information for the same taxpayer 12. For example, knowing a taxpayer's annual income may be of little value to the third party 34. However, knowing the taxpayer's annual income, the geographic area in which they live, and that they intend to buy a house in the next year could be very valuable to a realtor or mortgage company. Similarly, for example, knowing the age of a taxpayer 12 is of little value, but when combined with the taxpayer's annual income, mailing address, and favorite store, the aggregated information becomes valuable. As used herein, a "taxpayer-specific item" includes aggregation data. The aggregation can be of different types of data or the same type of data. For large sets of taxpayer information 20, the possible combinations of taxpayer-specific items 26 into aggregate data can become very large; however, each such combination is referred to herein as a "taxpayer-specific item."

Taxpayer-specific items 26 may have value even when not aggregated together. For example, if the third party 34 has a pre-existing relationship, such that it already has some information about the taxpayer 12, then a single item 26 may be of value. Similarly, for example, the third party 34 may only be interested in members per household statistics. Similarly, for example, the third party 34 may only be interested in the mailing address of the taxpayer 12.

The taxpayer profile 30 is a specific type of aggregate data. The taxpayer profile 30 comprises a plurality of taxpayer-specific items 26 from at least one of the above-mentioned data types. The taxpayer profile 30 gives a general picture of the taxpayer 12 that third parties 34 can evaluate to determine whether they would be interested in purchasing additional taxpayer-specific items 26, and, if so, how much they would be willing to give in consideration for these additional taxpayer-specific items 26.

In embodiments of the invention, the computer program generates, assigns, or receives the descriptor 28 for each taxpayer-specific item 26. The computer program may generate the descriptor 28 by, for example, analyzing an electronic W2 to determine descriptors 28 for the various monetary figures based upon their position on the W2 or the accompanying text. The computer program may assign the descriptor 28 by receiving an input into a text field that prompts for a certain type of information. The computer program may receive the descriptor 28 from another computer program that has already generated or assigned the descriptor 28.

Absent the descriptor 28, many taxpayer-specific items 26 have little or no value. For example, "$85,000" is of little value to the third party 34, unless the computer program attaches to the taxpayer-specific item 26 the descriptor 28 that "$85,000" is the annual household income. Similarly, "5" is of no value to the third party 34 unless the computer program attaches to the taxpayer-specific item 26 the descriptor 28 that "5" is the number of people in the household.

In embodiments of the invention, the descriptor 28 further comprises a year, or other time-stamp, to which the taxpayer-specific item 26 relates. As discussed in more detail below, because the age of a particular taxpayer-specific item 26 may be relevant to the value placed on the item 26 by a third party, embodiments of the invention include how a time when the item 26 was provided by the taxpayer, received by the virtual venue 10, or otherwise obtained.

In embodiments of the invention, the descriptor 28 further comprises a name or other indication of which person the taxpayer-specific item 26 relates to. For example, the computer program may attach the name of a first spouse to the first spouse's age and attach the name of a second spouse to the second spouse's age. In other embodiments, the computer program ascribes descriptors 28 to categories of taxpayer-specific items 26.

The computer program presents the descriptor 28 of the taxpayer-specific item 26 to the third party 34. Presenting the descriptor 28 to the third party 34 along with the taxpayer profile 30 allows the third party 34 to determine what, if any, value they would be willing to pay for the taxpayer-specific item 26. In embodiments, the computer program also presents the taxpayer profile 30 to the third party 34. Presenting the taxpayer profile 30 to the third party 34 allows the third party 34 to determine what, if any, value they would be willing to pay to potentially obtain the taxpayer 12 as a customer or participant.

In some embodiments, the computer program presents an option to the third party 34 to indicate the type of taxpayer 12 and/or taxpayer-specific items 26 in which it might be interested. The third party 34 may input one or more criteria into the computer program. The computer program then only presents the descriptor 28 of the taxpayer-specific items 26 for taxpayers 12 that meet those criteria. For example, a third party 34 may indicate that it is only interested in taxpayers 12 of the highest tax bracket. As another example, the third party 34 may indicate that it is only interested in taxpayers 12 in a specific geographic location. As yet another example, the third party 34 may indicate that it is only interested in physical addresses as the contact method for taxpayers 12.

The computer program generates a third-party value 38 for at least a portion of the taxpayer-specific items 26. In some embodiments, the computer program provides a set price for each category of taxpayer-specific items 26. In other embodiments of the invention, the computer program calculates an estimated third-party value 38, based upon the sale of prior taxpayer-specific items 26 of the same or similar category, or other market considerations. In still other embodiments, the computer program conducts, either directly or indirectly, an auction 48 for the taxpayer-specific items 26, in which third parties 34 submit bids 32 for the taxpayer-specific items 26. In one embodiment, this process is automated, such that the entire auctioning process takes only a few seconds or minutes. In another embodiment, the process waits for the third parties 34 to manually enter bids 32. The computer program may present an option to the taxpayer 12 or the tax preparer 14 for how long to allow the third parties 34 to manually enter bids 32.

As used herein, the "value" of information is indicative of the importance, worth, or regard placed on the information by a third party. The value of the information can have a monetary value, a point-based value redeemable for goods, a value in services, a credit to a previously-owed debt, etc.

In embodiments of the invention, the third-party value 38 generated depends in part on the timeliness of the information. Much of the value of the information is in its timeliness. For example, if the tax return 16 is filed on February 1 of a given year, the tax return 16 reflects the data that is only one month old (i.e., data associated with the prior tax year running from January 1 to December 31). As another example, if the tax return 16 is filed on April 15 of a given year, the tax return 16 reflects data that is only three and one half months old. This data gives a current, or nearly current, picture of the taxpayer 12, which third parties 34 will more highly value. Some taxpayer-specific items 26 within the marketable information set 24 are older and may therefore be of a lower value, such as those associated with prior tax years. Some taxpayer-specific items 26 spanning multiple years may also have a higher value because they demonstrate trends over time regarding the taxpayer 12. In embodiments of the invention, the generated tax-specific information is presented to the third party for sale less than or equal to one year, six months, two months, one month, two weeks, or one week from when the information was obtained from the taxpayer. Alternatively, the tax-specific information is generated within one year, six months, two months, one month, two weeks, or one week from when the information was obtained from the taxpayer, such as when a tax return for the taxpayer was filed.

In embodiments of the invention, the third-party value 38 generated depends in part on the veracity of the information. Much of the value of the information is that it is verifiable. Some taxpayer-specific items 26, such as the qualitative data discussed above, cannot be independently verified because these taxpayer-specific items 26 are generated based upon the taxpayer's expression of interest or intention. In contrast, some taxpayer-specific items 26, such as annual household income, are verifiable based upon W2 and 1099 forms indicative of the taxpayer 12. For these taxpayer-specific items 26, the computer program may provide verification to the third party 34 of the accuracy of the taxpayer-specific item 26.

Other considerations may go into the determined third-party value 38. In one embodiment, the third party 34 may be be willing to pay more for the taxpayer-specific item 26 if the taxpayer agrees to sell the taxpayer-specific item 26 to only that third party 34. In another embodiment, the third party 34 would be willing to pay more for the taxpayer-specific item 26 of the taxpayer 12 with which they have a previously established relationship. In still another embodiment, the third party 34 would be willing to pay more for the taxpayer-specific item 26 if the taxpayer permitted the third party 34 to resell the taxpayer-specific item 26 to other third parties 34.

In embodiments of the invention, the computer program generates the third-party value 38 by a method comprising the auction 48. The computer program presents, to a plurality of third parties 34, the descriptor 28 and the taxpayer profile 30. Based upon the information presented, the computer program invites each third party 34 to bid 32 a third-party value 38 that they would pay for the taxpayer-specific item 26 described by the descriptor 28 and or taxpayer profile 30. In embodiments, the computer program may place a time limit or other restraint on the bids 32. Third parties 34 may automate the bidding process by establishing criteria, via the computer program, for categories of taxpayer-specific items 26 and/or taxpayer profiles 30 that they are interested in. The computer program may also elicit a standing bid from the third party 34. The standing bid is an amount that the third party 34 would be willing to pay for any taxpayer-specific item meeting a certain criteria. The computer program then need not elicit a bid for every transaction and can instead supply the standing bid amount for that third party 34.

In other embodiments of the invention, the computer program generates the third-party value 38 by a method comprising determining a standard value. The standard value is calculated for each taxpayer-specific item 26. In other embodiments, the standard value is calculated for each category. In still other embodiments, the standard value is assigned to the taxpayer-specific item 26 based upon its category. In yet further embodiments, the standard value is calculated based upon the sale of prior sales of that category of information. In some embodiments, the standard value may decrease over a period of time, because the information is not as current and to encourage its purchase by the third party 34.

In other embodiments of the invention, the computer program generates the third-party value 38 by a method comprising determining the standard value and holding the auction 48. In embodiments, the computer program generates the standard value as discussed above. The computer program then presents to the third party 34 the descriptor 28, the taxpayer profile 30, and the standard value. The third party 34 is then invited to submit bids 32 at or above the standard value.

The computer program generates the sale value 36 for the taxpayer-specific item 26. The sale value 36 is the amount of compensation (either monetary, non-monetary, or in exchange for services) that the taxpayer 12 will receive for selling their taxpayer-specific item 26. The sale value 36 is the third-party value 38 less the commission 40, discussed below. In another embodiment of the invention, the sale value 36 is equal to the third-party value 38. In still another embodiment, the sale value 36 is the third-party value 38 plus an incentive value provided by the computer program to encourage the sale.

In embodiments of the invention, the sale value 36 is generated before the third-party value 38 is generated. In this embodiment, the tax preparer 14 or the computer program inquires of the taxpayer 12 at what price they would be willing to sell the taxpayer-specific item 26.

In embodiments of the invention, the computer program retains the commission 40. In one embodiment, the method of retaining the commission 40 comprises the steps of receiving, from the third party 34, the third-party value 38; transmitting the commission 40 to a system account, wherein the system account is a bank account in the name or control of the system or a controlling entity; and transmitting to the taxpayer 12 the sale amount. In another embodiment, the method of retaining the commission 40 comprises the steps of receiving, from the third party 34, information indicative of the third party 34 paying the sale value 36 to the taxpayer 12; and receiving the commission 40 from the third party 34. In some embodiments of the invention, all or a portion of the commission is transmitted to the tax preparer 14 in compensation for referring the taxpayer 12 to the system.

In embodiments of the invention, the computer program determines the amount of the commission 40. In one embodiment, the commission 40 is determined as a percentage of the third-party value 38. In another embodiment of the invention, the commission 40 is determined as a set monetary value, regardless of the third-party value 38. In yet another embodiment, the commission 40 is determined based upon an analysis of the taxpayer profile 30. For example, the computer program may charge a 10% commission 40 for taxpayer-specific items 26 related to taxpayers 12 in the top tax bracket, 8% for taxpayer-specific items 26 related to taxpayers 12 in the next-lower tax bracket, etc. In still other embodiments of the invention, the amount of the commission 40 is determined by a contract between a controlling entity of the computer program and the third party 34. In yet another example, the third party 34 may include an amount for the commission 40 in the bid for the third party value 38. For example, the third party may indicate that it is willing to pay an additional 15% commission over the third party value 38 for the taxpayer-specific item 26. The computer program may analyze the amount of the commission 40 when selecting a winning bid.

The computer program presents the option 42 to the taxpayer 12 to sell at least one taxpayer-specific item 26 subsequent to the generation of the third-party value 38 and the sale value 36. This embodiment is advantageous because it presents the option to sell 42 along with the amount that the taxpayer 12 will receive in the form of the sale value 36. In another embodiment, the computer program presents the option 42 to the taxpayer 12 to sell at least one taxpayer-specific item 26 prior to the generation of the third-party value 38 and the sale value 36. This embodiment is advantageous because it minimizes the unnecessary generation of third-party values 38 and sale values 36 for taxpayers 12 who would not be interested, regardless of the value presented. In yet another embodiment of the invention, the computer program presents an option to the taxpayer 12 to allow the computer program to generate the sale value 36. This embodiment is advantageous because it gauges an initial interest level of the taxpayer 12 before committing the resources to generate the sale values 36. In a still further embodiment, the computer program presents to the taxpayer 12 an option to select certain categories of taxpayer-specific items 26 that the taxpayer 12 may be interested in selling. The computer program then generates the sale values 36 for taxpayer-specific items 26 only within the selected categories.

In embodiments of the invention, the computer program generates a list of third parties 34 and presents the list to the taxpayer 12 or tax preparer 14. The list of third parties 34 is generated by the computer program assembling a list of third parties 34 that have an account, discussed below, associated with the computer program. In embodiments, the third parties 34 may select to remove themselves from the list for taxpayers 12 having a certain profile 30. For example, the third party 34 may elect to only appear on the list of third parties 34 for taxpayers 12 within the highest tax bracket.

In one embodiment of the invention, the list of third parties 34 comprises a list of third-party categories. Exemplary third-party categories include mortgage lenders, retail shops, financial planners, vehicle manufacturers, tax preparers, survey companies, and universities. In one embodiment of the invention, the list of third-party categories can be winnowed down to individual third parties 34 within each third-party category. The third-party categories and the list of third parties 34 may further include descriptions about the category or the individual third parties 34 within each category. This provides the taxpayer 12 with information about the third parties 34 with which he may sell his information.

The computer program receives a selection of the third-party categories or the individual third parties 34 for which the computer program will generate the third-party value 38. In another embodiment, the computer program will by default obtain the third-party value 38 for every third party 34 unless the taxpayer 12 declines those specific third-party categories or third parties 34.

The computer program presents to the taxpayer 12 the option to sell 42. The option to sell 42 may further comprise a consent form and cautionary information about the potential secondary effects of selling the information. The presentation may contain information indicative of the taxpayer-specific item 26 or items to the sold, the sale value or values 36, and the purchasing third party or parties 34.

The computer program receives information indicative of the taxpayer's 12 selection 44, consent, and desire to sell. The information may further include a selection of certain taxpayer-specific items 26 and/or third parties 34 that the taxpayer 12 does not consent and desire to sell.

The computer program then sends a notification 50 indicative of the taxpayer's 12 selection to sell 44 to the third party 34. In embodiments, the notification 50 is accompanied by the taxpayer-specific item 26 or items purchased by the third party 34. In other embodiments, the taxpayer-specific item 26 or items are not sent until the computer program has received the third-party value. The computer program may receive the third-party value 38 by adding the third-party value 38 to a tab that the third party 34 has with the computer program, by receiving a transfer of funds, or by deducting the third-party value 38 from a retainer that the third party 34 has previously paid. In some embodiments, the third-party value 38 is not received until a pre-set time, such as the end of the month.

The computer program transmits to the taxpayer 12 a payment of the sale value 36, as defined above. The computer program may then allow the taxpayer 12 to use all or some of the sale value 36 to be a credit toward the services of the tax preparer 14 or financial professional. In this way, the taxpayer 12 can receive tax preparation services at a reduced or no cost. In other embodiments, the sale value 36 is transmitted to the taxpayer 12 in the form of a gift card, a direct deposit, a credit at a retailer, a check, or cash. The taxpayer 12 may also receive the sale value 36 in addition to, and with, their tax refund.

The virtual venue 10 will now be discussed in greater detail. The virtual venue 10 is an electronic resource, such as a website or an electronic app (e.g., a mobile "app"). In embodiments of the invention, execution of the computer program by at least one processing element generates the virtual venue 10 that facilitates the transactions for taxpayer-specific items 26 between taxpayers 12 and third parties 34. The virtual venue 10 presents information indicative of the taxpayer-specific items 26 for sale or auction to the third parties 34. The virtual venue 10 also presents information indicative of the third parties 34 available to purchase taxpayer-specific items 26. The virtual venue 10 also presents warnings and legal information to the taxpayer 12 and to the third party 34. The virtual venue 10 may present different accounts for different users and require the users to log in. The virtual venue 10 also monitors the progress of auctions 48 and transactions on behalf of the taxpayer 12 and the third parties 34.

In embodiments of the invention, the virtual venue 10 has a search function. As utilized by the taxpayer 12, the search function allows the taxpayer 12 to search for third parties 34, either individually or by category, that may be interested in purchasing their taxpayer-specific items 26.

In embodiments of the invention, the virtual venue 10 tracks and analyzes a purchasing history of third parties 34 and/or a selling history of taxpayers 12. The virtual venue 10 may then present this information, or a representation thereof, to taxpayers 12 and/or third parties 34. For example, the third party 34 may be willing to pay more for a taxpayer-specific item 26 from the taxpayer 12 who has not sold any information previously. Similarly, the taxpayer 12 may not be willing to sell taxpayer-specific items 26 to a third party that has purchased a large number of taxpayer-specific items 26 from other taxpayers.

In embodiments of the invention, the virtual venue 10 allows the taxpayer 12 to rate, grade, or review the third parties 34 with whom they transact. This allows other taxpayers to read reviews and see the rating or grade of the third party 34 before transacting with them. This encourages other taxpayers to enter future transactions and discourages the third parties 34 from mismanaging information or mistreating the taxpayers. In embodiments of the invention, the virtual venue 10 presents a button or an option for the taxpayer 12 to file a complaint or raise concerns about a specific third party 34 or an entire category of third parties.

The virtual venue 10 displays information to third parties 34 to facilitate the transactions, and continuously updates (e.g., every minute, every five minutes, every thirty minutes, every hour, every day, every week, every month, every quarter, every six months, and/or every year) the information to ensure that the third party 34 is receiving current information. The virtual venue 10 may permit the third party 34 to view specific bids 32 and elicit their own bids 32 to specific taxpayers 12. The virtual venue 10 may also track the purchasing history, generate reports, and assemble and organize the purchased taxpayer-specific items 26.

Figure 3:
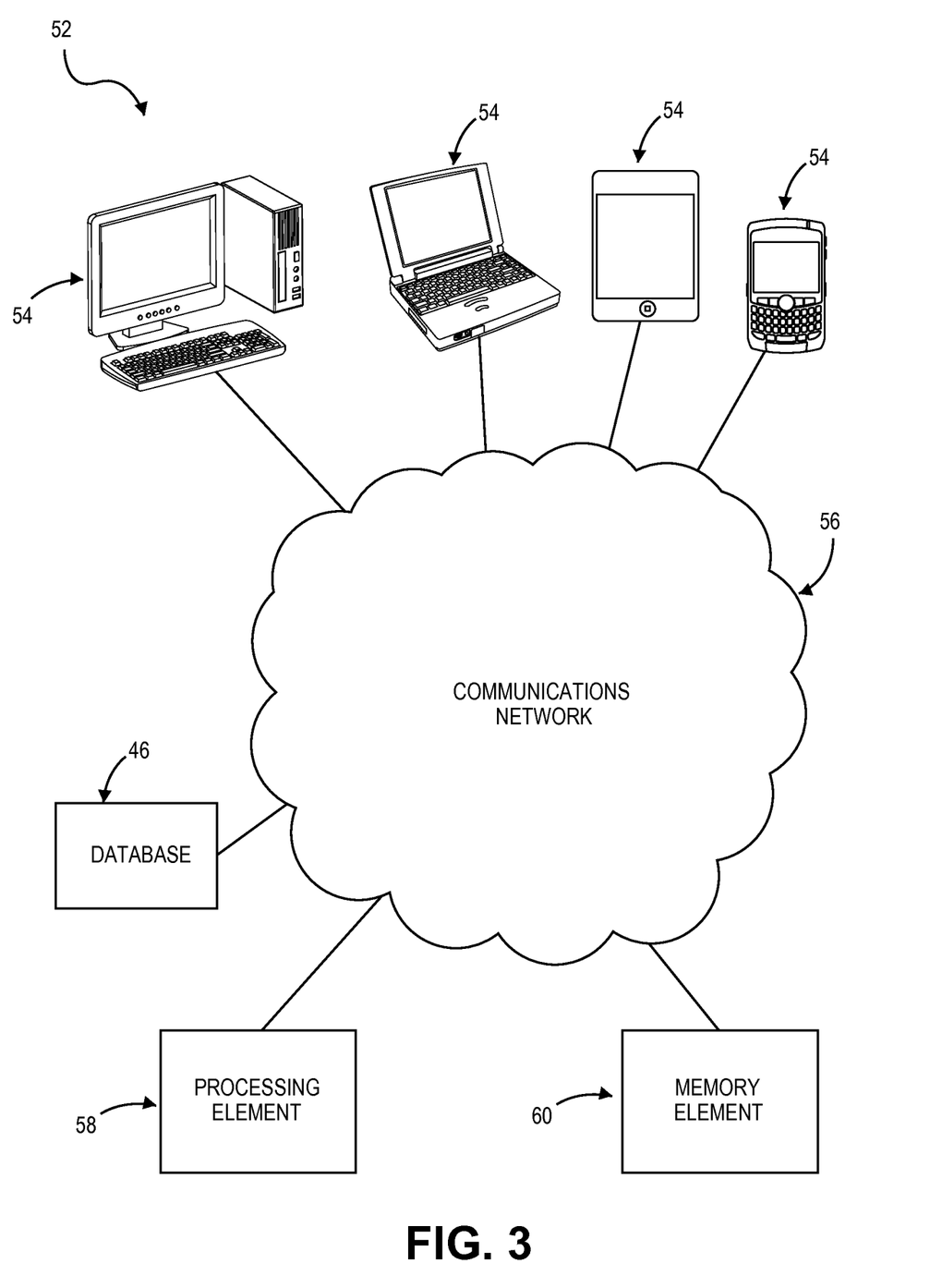
FIG. 3 is a system diagram of an embodiment of the invention depicting various components of the system.

Turning to FIG. 3, a system 52 of embodiments of the invention will now be discussed. The system 52 may comprise computing devices 54 to facilitate the functions and features described herein. The computing devices 54 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system 52.

The computer program of embodiments of the invention comprises a plurality of code segments executable by the computing device 54 for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system 52, and method of embodiments of the invention may be implemented in hardware, software, firmware, or combinations thereof using the system 52, which broadly comprises server devices, computing devices 54, and a communication network 56.

The computer program of embodiments of the invention may be responsive to user input. As defined herein user input may be received from a variety of computing devices 54 including but not limited to the following: desktops, laptops, calculators, telephones, smartphones, or tablets. The computing devices 54 may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices 54 may include any device, component, or equipment with at least one processing element 58 and at least one memory element 60. The processing element 58 may implement operating systems, and may be capable of executing the computer program, which is also generally known as instructions, commands, software code, executables, applications ("apps"), and the like. The at least one processing element 58 may comprise processors, microprocessors, microcontrollers, field programmable gate arrays, and the like, or combinations thereof. The at least one memory element 60 may be capable of storing or retaining the computer program and may also store data, typically binary data, including text, databases, graphics, audio, video, combinations thereof, and the like. The at least one memory element 60 may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to the at least one memory element 60, the server devices may further include file stores comprising a plurality of hard disk drives, network attached storage, or a separate storage network.

The computing devices 54 may specifically include mobile communication devices (including wireless devices), work stations, desktop computers, laptop computers, palmtop computers, tablet computers, portable digital assistants (PDA), smart phones, and the like, or combinations thereof. Various embodiments of the computing device 54 may also include voice communication devices, such as cell phones and/or smart phones. In preferred embodiments, the computing device 54 will have an electronic display operable to display visual graphics, images, text, etc. In certain embodiments, the computer program facilitates interaction and communication through a graphical user interface (GUI) 62 that is displayed via the electronic display. The GUI 62 enables the user to interact with the electronic display by touching or pointing at display areas to provide information to the system 52.

The communication network 56 may be wired or wireless and may include servers, routers, switches, wireless receivers and transmitters, and the like, as well as electrically conductive cables or optical cables. The communication network 56 may also include local, metro, or wide area networks, as well as the Internet, or other cloud networks. Furthermore, the communication network 56 may include cellular or mobile phone networks, as well as landline phone networks, public switched telephone networks, fiber optic networks, or the like.

The computer program may run on computing devices 54 or, alternatively, may run on one or more server devices. In certain embodiments of the invention, the computer program may be embodied in a stand-alone computer program (i.e., an "app") downloaded on a user's computing device 54 or in a web-accessible program that is accessible by the user's computing device 54 via the communication network 56. As used herein, the stand-along computer program or web-accessible program provides users with access to an electronic resource from which the users can interact with various embodiments of the invention.

In embodiments of the invention, users may be provided with different types of accounts. Each type of user account may provide their respective users with unique roles, capabilities, and permissions with respect to implementing embodiments of the invention. For instance, the taxpayer 12 may be provided with a taxpayer account that permits the taxpayer 12 to access embodiments of the invention that are applicable to the taxpayer 12 selling, or offering for sale or auction, the taxpayer-specific items 26. Additionally, the third party 34 may be provided with a third party account that permits the third party 34 to access embodiments of the invention that are applicable to managing the various requests and bids 32 to buy taxpayer-specific items 26. Additionally, the tax preparer 14 or financial professional may be provided with a tax preparer account or financial professional account, respectively, through which he can monitor the offers and sales of the personal information for his clients. In addition, any number and/or any specific types of account are provided to carry out the functions, features, and/or implementations of the invention. Upon the taxpayer 12, third party 34, tax preparer 14, and/or financial professional logging in to the electronic resource for a first time, they may be required to provide various pieces of identification information to create their respective accounts. Such identification information may include, for instance, personal name, business name, email address, phone number, or the like. Upon providing the identification information, the taxpayer 12, third party 34, and/or tax preparer 14 may be required to enter (or may be given) a username and password, which will be required to access the electronic resource.

Figure 4:
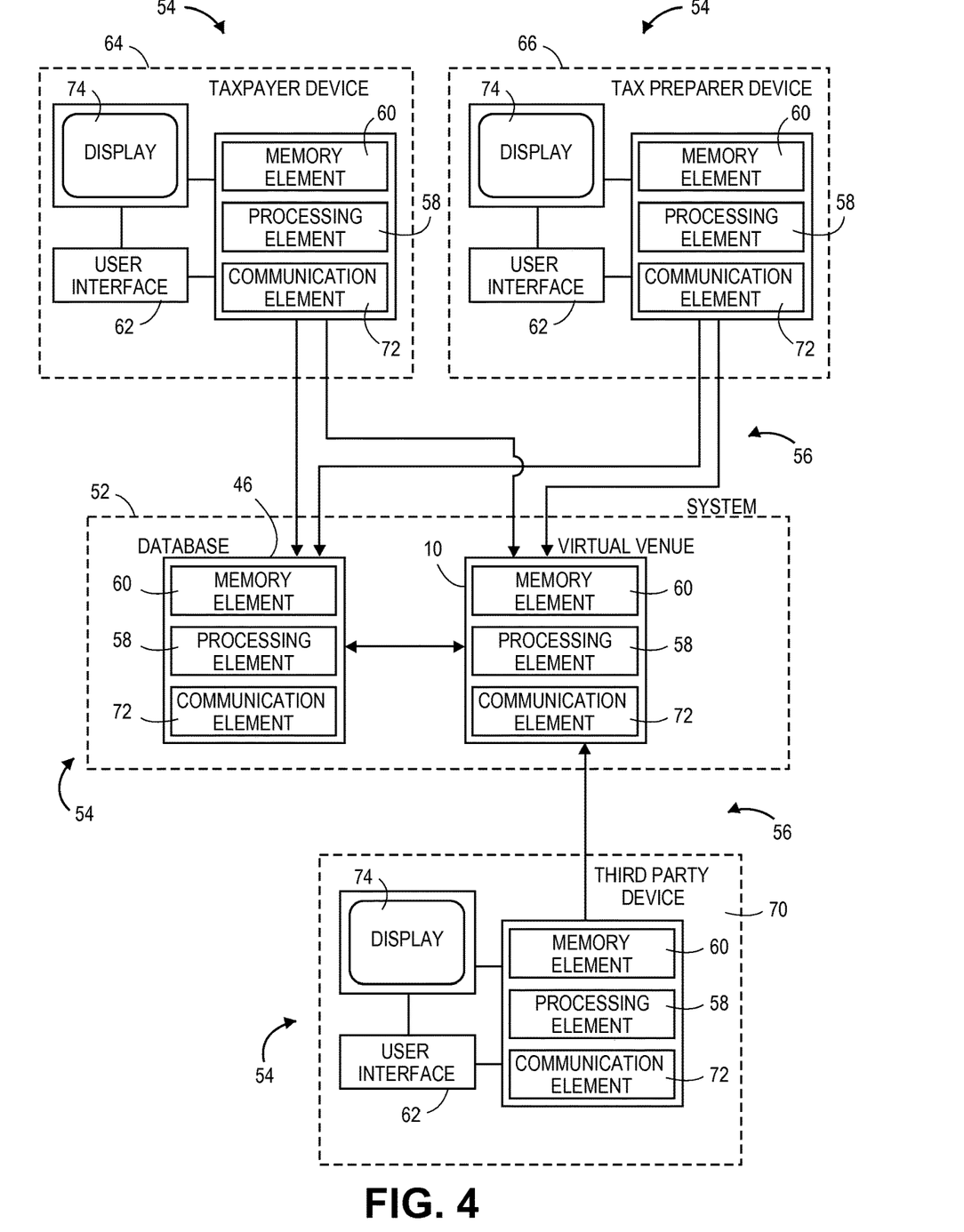
FIG. 4 is a system diagram of an embodiment of the invention depicting various computing devices and their components.

Turning to FIG. 4, the specific components of the system 52 will now be discussed. The system 52 comprises a tax preparation device 66, a virtual venue device 68, and at least one third-party device 70. In embodiments of the invention, the system 52 further comprises a taxpayer device 64. In embodiments of the invention, the system 52 further comprises the database 46 for storing the set of taxpayer information 20 and/or the marketable information set 24. The third-party device 70, the taxpayer device 64, and the tax preparation device 66 each comprise the following: a display 74 adapted to present the GUI 62, at least one processing element 58, at least one memory element 60, and at least one communication element. The virtual venue device and database 46 each comprise the following: at least one processing element 58, at least one memory element 60, and at least one communication element. The virtual venue device 68 and/or the database 46 may further comprise a display 74 adapted to present the GUI 62. The various components of the system 52 are adapted to communicate with each other via their communication elements and the communication network 56.

Although embodiments of the invention have been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A non-transitory computer readable storage medium having a computer program stored thereon for providing a graphical user interface to a virtual venue to facilitate a transaction of at least a portion of a set of taxpayer information between a taxpayer and a third party, wherein execution of the computer program by at least one processing element performs the steps of: receiving, via the graphical user interface, the set of taxpayer information from the taxpayer for a tax return preparation process, wherein the taxpayer information comprises social media postings; verifying that the taxpayer information is current; verifying the accuracy of the taxpayer information; preparing and filing a tax return with the set of taxpayer information using a tax preparation software; automatically, upon filing of the tax return, receiving the set of taxpayer information from the filed tax return; filtering the set of taxpayer information from the filed tax return to obtain a marketable information set, wherein the marketable information set contains a plurality of taxpayer-specific items; categorizing each taxpayer-specific item; removing, from the marketable information set, each taxpayer-specific item within a category, wherein the category to be removed comprises at least one of sensitive information, unmarketable information, or repetitive information; generating a third-party value for each taxpayer-specific item within a remaining category of the marketable information set, wherein the third-party value is generated based at least in part on the time of filing of the tax return; presenting, via the graphical user interface, to the taxpayer a sale value for each taxpayer-specific item within the remaining category, wherein the sale value is less than or equal to the third-party value; presenting, via the graphical user interface, an option for the taxpayer to select at least one taxpayer-specific item within the remaining category to be sold in the virtual venue; presenting graded reviews about the third-party from other taxpayers who have transacted with the third-party; presenting, via the graphical user interface, an option for the taxpayer to select at least one third party to which to sell said at least one taxpayer-specific item within the remaining category; receiving, via the graphical user interface, from the taxpayer a selection to sell said at least one taxpayer-specific item within the remaining category to said at least one third party in the virtual venue; facilitating the transaction between the taxpayer and the third party in the virtual venue, wherein the virtual venue is updated periodically over time to ensure that the taxpayer information is current, wherein the virtual venue provides for remote access to the taxpayer and third-party; and presenting, via the graphical user interface, an option for the taxpayer to utilize at least a portion of a proceed from the sale as a credit toward services generating said Ned tax return related to the marketable information that was sold.

2. The computer readable storage medium of claim 1, wherein the generating of the third-party value for the taxpayer-specific item is performed within six months of a date the tax return was filed.

3. The computer readable storage medium of claim 1, wherein the sale value is the third-party value minus a commission.

4. The computer readable storage medium of claim 1, wherein the computer program instructs the at least one processing element to perform the step of providing, to the third party, a set of contact information for the taxpayer.

5. The computer readable storage medium of claim 1, wherein the computer program instructs the at least one processing element to perform the step of verifying to the third party that the marketable information set accurately relates to the taxpayer.

6. The computer readable storage medium of claim 5, wherein the computer program instructs the at least one processing element to perform the steps of:
generating a virtual venue to facilitate the exchange of taxpayer-specific items;
presenting, to the third party, a list of the taxpayer-specific items that are available; and
soliciting at least one bid from the third party for at least one taxpayer-specific item from the list of taxpayer-specific items.

7. The computer readable storage medium of claim 6, wherein the third-party value is generated by steps comprising:
generating a descriptor for the taxpayer-specific item;
presenting the descriptor to at least one third party;
receiving at least one bid from the at least one third party for the taxpayer-specific item, as described by the descriptor; and
determining the third-party value based upon the highest of the at least one bid received.

8. The computer readable storage medium of claim 7, wherein the third-party value is generated by the steps further comprising:
generating a profile for the taxpayer,
wherein the profile comprises a set of demographic information indicative of the taxpayer; and
presenting the profile along with the descriptor to the at least one third party.

9. The computer readable storage medium of claim 8, wherein the generating of the third-party value for each taxpayer-specific item within the marketable information set is dependent on a category of each taxpayer-specific item, such that a first category of taxpayer-specific item is assigned a higher third-party value than a second category of taxpayer-specific item.

10. The computer readable storage medium of claim 9, wherein the generating of the third-party value for each taxpayer-specific item within the marketable information set is further dependent on an aggregation of taxpayer-specific items, wherein at least two of the aggregated taxpayer-specific items are in at least two different categories, such that the third-party value of the aggregated taxpayer-specific items is greater than a sum of third-party values for each taxpayer-specific items within the aggregation.

11. A computerized method for facilitating a transaction of at least a portion of a set of taxpayer information between a taxpayer and a third party, the method comprising the following steps: receiving, via a processing element, the set of taxpayer information from the taxpayer for a tax return preparation process, wherein the taxpayer information comprises social media postings; verifying that the taxpayer information is current; verifying the accuracy of the taxpayer information; preparing and filing a tax return with the set of taxpayer information using a tax preparation software; automatically, upon filing of the tax return, receiving the set of taxpayer information from the filed tax return; filtering, via the processing element, the set of taxpayer information from the filed tax return to obtain a marketable information set, wherein the marketable information set contains a plurality of taxpayer-specific items; categorizing each taxpayer-specific item; removing from the marketable information set each taxpayer specific item within a category, wherein the category to be removed comprises at least one of sensitive information, unmarketable information, or repetitive information; generating, via the processing element, a third-party value for each taxpayer-specific item within a remaining category of the marketable information set; presenting, to the taxpayer and via a graphical user interface, a sale value for each taxpayer-specific item within the remaining category, wherein the sale value is less than or equal to the third-party value; presenting, via the graphical user interface, an option for the taxpayer to select at least one taxpayer-specific item within the remaining category to be sold in a virtual venue; presenting graded reviews about the third-party from other taxpayers who have transacted with the third-party; presenting, via the graphical user interface, an option for the taxpayer to select at least one third party to which to sell said at least one taxpayer-specific item within the remaining category; receiving, from the taxpayer and via the processing element, a selection to sell said at least one taxpayer-specific item within the remaining category to said at least one third party in the virtual venue; facilitating the transaction between the taxpayer and the third party; wherein the virtual venue provides for remote access to the taxpayer and third party; and presenting an option for the taxpayer to utilize at least a portion of a proceed from the sale as a credit toward services generating said filed tax return related to the marketable information that was sold.

12. The computerized method of claim 11, wherein the generating of the third-party value for the taxpayer-specific item is performed within six months of a date the tax return was filed.

13. The computerized method of claim 11, wherein the sale value is the third-party value minus a commission.

14. The computerized method of claim 11, further comprising the step of providing, to the third party and after receipt of the selection to sell by the taxpayer, a set of contact information for the taxpayer.

15. The computerized method of claim 11, further comprising the step of verifying, to the third party, that the marketable information set accurately relates to the taxpayer.

16. The computerized method of claim 15, further comprising the steps of:
generating, via the processing element, the virtual venue to facilitate the exchange of taxpayer-specific items;
presenting, via the graphical user interface and to the third party, a list of the taxpayer-specific items that are available; and
soliciting at least one bid from the third party for at least one taxpayer-specific item from the list of taxpayer-specific items.

17. The computerized method of claim 16, wherein the third-party value is generated by steps comprising:
obtaining, via the processor, a descriptor for the taxpayer-specific item;
presenting, via the processor, the descriptor to at least one third party;
receiving at least one bid from the at least one third party for the taxpayer-specific item, as described by the descriptor; and
determining, via the processing element, the third-party value based upon the highest of the at least one bid received.

18. The computerized method of claim 17, wherein the third-party value is generated by the steps further comprising:
generating, via the processing element, a profile for the taxpayer,
wherein the profile comprises a set of demographic information indicative of the taxpayer; and
presenting the profile along with the descriptor to the at least one third party.

19. The computerized method of claim 18, wherein the generating of the third-party value for each taxpayer-specific item within the marketable information set is dependent on a category of each taxpayer-specific item, such that a first category of taxpayer-specific item is assigned a higher third-party value than a second category of taxpayer-specific item.

20. The computerized method of claim 19, wherein the generating of the third-party value for each taxpayer-specific item within the marketable information set is further dependent on an aggregation of taxpayer-specific items, wherein at least two of the aggregated taxpayer-specific items are in at least two different categories, such that the third-party value of the aggregated taxpayer-specific items is greater than a sum of third-party values for each taxpayer-specific items within the aggregation.

* * * * *